US005423562A

United States Patent [19]

Pearce, Jr.

[11] Patent Number: 5,423,562

[45] Date of Patent: Jun. 13, 1995

[54] CHAIR LIFT

[76] Inventor: Fredric C. Pearce, Jr., Hwy. 72 & Addison Rd., Arcadia, Fla. 33821

[21] Appl. No.: 147,310

[22] Filed: Nov. 5, 1993

[51] Int. Cl.[6] .................................. B62M 1/14

[52] U.S. Cl. .................................. 280/250.1; 280/657; 297/DIG. 4

[58] Field of Search ............. 280/47.38, 250.1, 87.021, 280/87.05, 657; 297/DIG. 4, 5; 5/86.1, 83.1, 81.1

[56] References Cited

U.S. PATENT DOCUMENTS

| | | | |
|---|---|---|---|
| 2,850,075 | 9/1958 | Wilson | 297/DIG. 4 |
| 3,189,345 | 6/1965 | Simpson | 5/81.1 |
| 3,623,169 | 11/1971 | James | 5/81.1 |
| 3,788,695 | 1/1974 | Salem | 297/DIG. 4 |
| 4,435,863 | 3/1984 | Lerich | 5/81.1 |
| 4,679,259 | 7/1987 | DiMatteo et al. | 5/81.1 |
| 4,719,655 | 1/1988 | Dean | 5/86.1 |
| 4,824,132 | 4/1989 | Moore | 280/304.1 |
| 4,858,261 | 8/1989 | Iura | 5/81.1 |
| 4,890,853 | 1/1990 | Olson | 280/87.021 |
| 4,941,708 | 7/1990 | Heffner | 297/6 |
| 4,969,221 | 11/1990 | Foster | 5/81.1 |
| 4,985,947 | 1/1991 | Ethridge | 5/81.1 |
| 5,060,960 | 10/1991 | Branscumb et al. | 280/657 |
| 5,112,076 | 5/1992 | Wilson | 280/657 |
| 5,137,102 | 8/1992 | Houston, Sr. et al. | 180/65.5 |
| 5,148,557 | 9/1992 | Fridman et al. | 5/81.1 |
| 5,179,745 | 1/1993 | Hebert et al. | 5/81.1 |
| 5,201,377 | 4/1993 | Wilson | 280/657 |
| 5,255,934 | 10/1993 | Wilson | 280/657 |

FOREIGN PATENT DOCUMENTS

| | | | |
|---|---|---|---|
| 2501038 | 9/1982 | France | 5/81.1 |

*Primary Examiner*—Michael S. Huppert
*Assistant Examiner*—Kevin Hurley
*Attorney, Agent, or Firm*—Cushman Darby & Cushman

[57] ABSTRACT

A chair for moving a non-ambulatory user having a first wheeled frame and a movable second frame that raises and lowers with respect to the first frame. A seat is releasably secured to the second frame so that the seat raises and lowers in combination with the second frame. The chair may have pivotable large wheels secured thereto to provide easier movement across a surface.

15 Claims, 4 Drawing Sheets

Fig. 1.
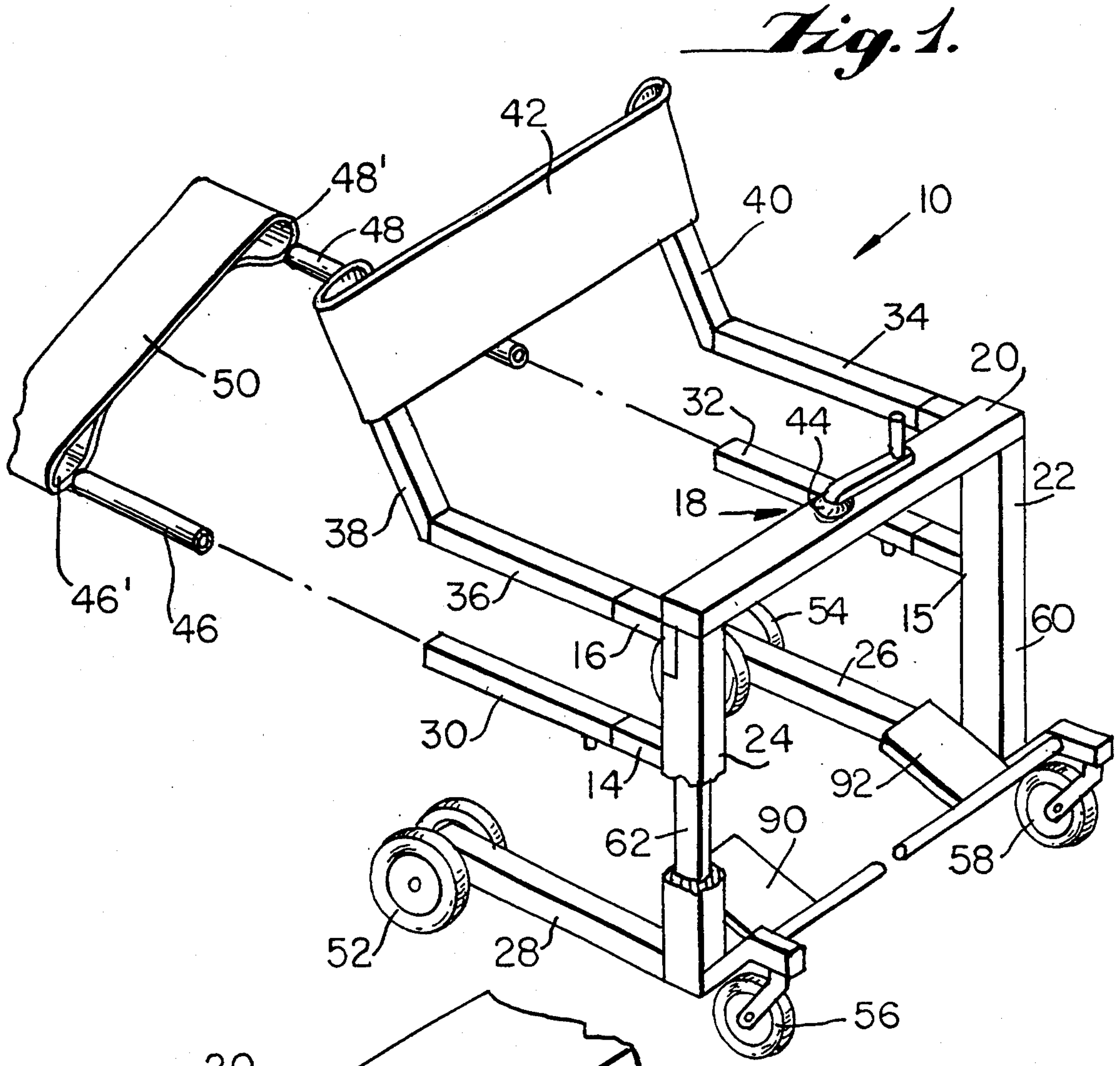
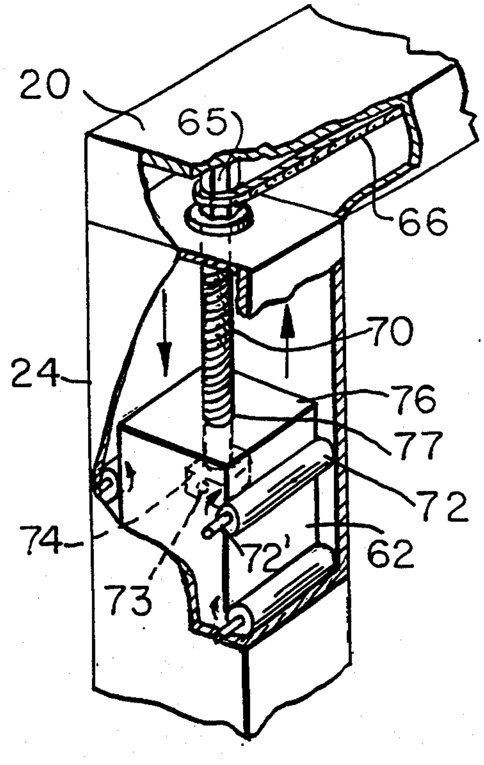
Fig. 4.

CHAIR LIFT

FIELD OF THE INVENTION

The present invention relates to chairs for non-ambulatory users and, more particularly, to a chair that is capable of easily lifting a non-ambulatory user from a sitting position while enabling the user to move over the ground on a wheeled frame.

BACKGROUND AND DESCRIPTION OF THE PRIOR ART

Many structural assemblies have been developed to enable non-ambulatory patients, injured persons and the like to move over the surface of the ground. Conventionally, these structures have incorporated large side wheels used in combination with either leading or trailing wheels provided for stability. In many instances, the needs of a patient are not satisfied by such constructions since they provide for little more than movement of the patient or user over the ground. In many instances, particularly in the case of elderly patients or severely handicapped persons, a lifting mechanism is also required. To this end, the prior art has provided relatively complicated and therefore expensive structures which are difficult for a user to employ safely. In many such structures of the prior art, the lifting mechanism is apt to failure or, conversely, is so complicated as to require constant mechanical attention to enable safe and easy operation.

SUMMARY OF THE INVENTION

The present invention has been developed to avoid the difficulties of the prior art noted above and to provide a substantially less expensive yet substantially more reliable wheelchair structure and one which will provide a lifting capability that can be used both by an attendant as well as by the user. In addition, the chair of the present invention will provide a safe lifting mechanism which will not require the user to position himself or herself by movement from a seated position to the chair seat.

In a preferred embodiment, the present invention uses a wheeled frame on which is mounted a movable frame. The movable frame includes side bars for engaging a looped seat which a user will have no difficulty placing under his or her posterior while in a seated position. A lifting mechanism is operable between the frame members and is readily accessible to the user from any position on the chair. A releasable back support is also provided in combination with collapsible support arms to facilitate movement of a patient or user into and off of the chair.

The foregoing and other objects will become apparent as consideration is given to the following detailed description taken in conjunction with the accompanying drawings, in which:

BRIEF DESCRIPTION OF THE DRAWINGS

FIG. 1 is a perspective view of a preferred embodiment of the chair of the present invention;

FIG. 4 is an enlarged detailed view of one end of the second frame member illustrating the lifting mechanism;

DETAILED DESCRIPTION OF THE INVENTION

Figure 3:
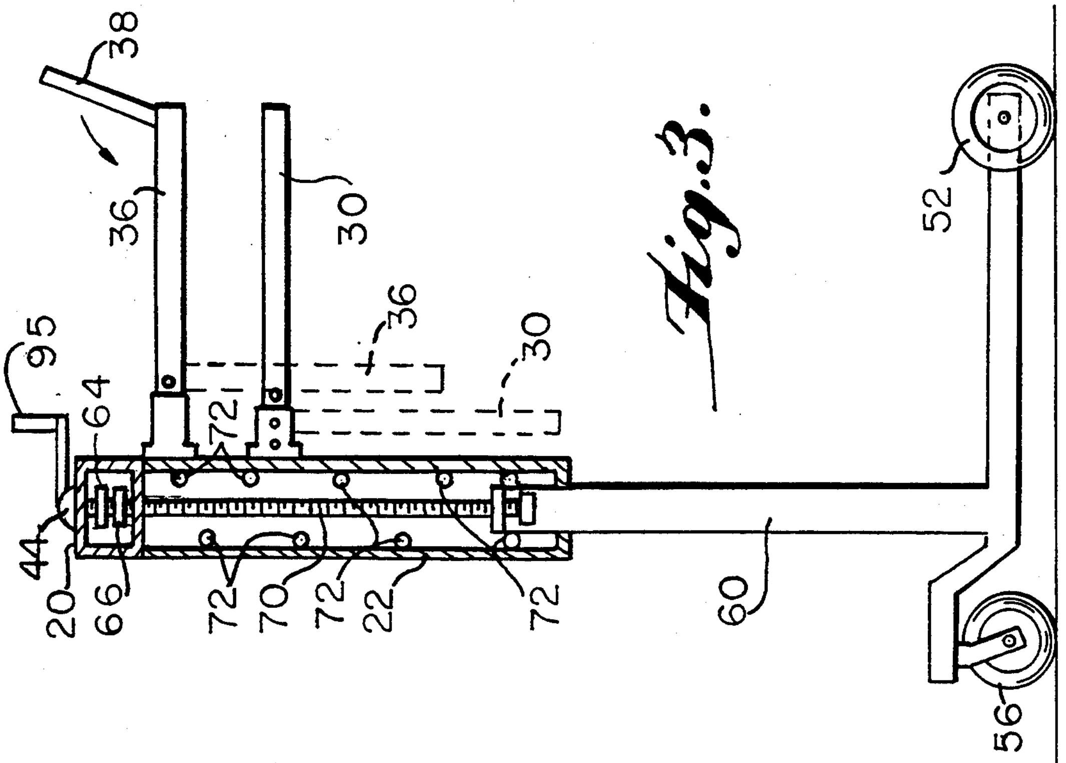
FIG. 3 is a side view in elevation, partly in section of the frames of the present invention.

Referring to the drawings wherein like numerals designate corresponding parts throughout the several views there is shown in FIG. 1 a perspective view of the chair lift device of the present invention generally designated at 10.

Figure 2:
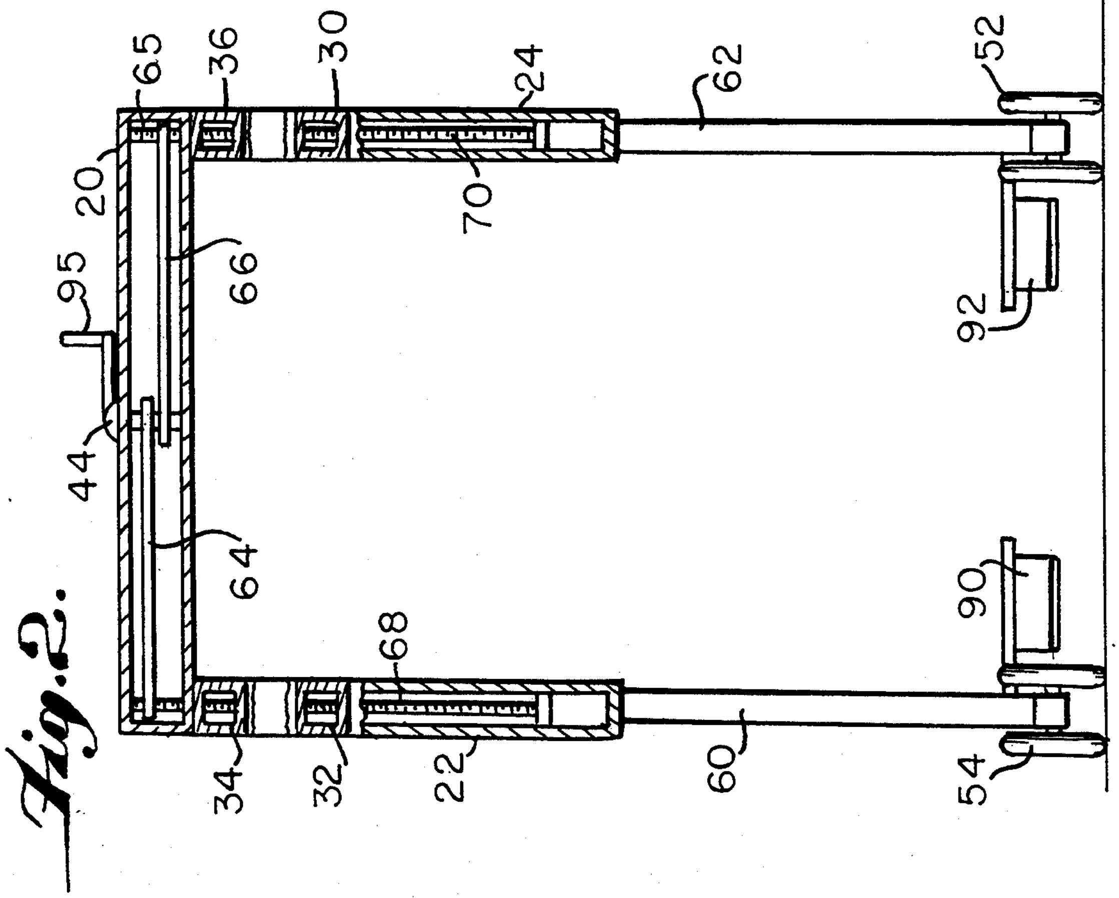
FIG. 2 is a rear view partially in section of the frame members of the present invention.

The chair 10 of the present invention is intended to be used not only by an attendant but also by a patient or non-ambulatory user and will enable the user to mount the chair from a seated position and to raise the body relative to the frame to facilitate movement over the floor or other relatively smooth surfaces. To this end, the chair lift 10 comprises a first frame which may include two separate frame elements, or arms, 26 and 28 each of which is provided at the front end with a caster mounted wheel, 56 and 58, in the position shown. At the rear of each the frame members 26 and 28, double wheeled assemblies 52 and 54 are provided. As shown in FIG. 2, extending upwardly from the respective frame members 26 and 28 are posts 60 and 62 which may be fixedly secured to the respective frame members 26 and 28 or pivotally secured for reasons discussed below. If desired, foot rests 90 and 92 are attached as by welding or bolting to the respective frame members 26 and 28. Furthermore, the chair 10 is collapsible for storage or movement by unbolting or unscrewing the connections holding the respective frame members together.

According to the present invention, a movable frame member 18 is provided and which is constructed with a horizontally extending arm 20 and depending hollow rectangular tubes 22 and 24, which encloseposts 60 and 62 respectively, as shown in dotted lines for tube 22 and in the partially broken away view for tube 24. The tubes 22 and 24 may be secured to the underside of the arm. 20 in any suitable manner such as by bolting, welding or the like. The cross frame arm 20 is also hollow, and as shown in FIGS. 3 and 4, includes a portion of the lifting mechanism to be described below.

In one embodiment, a pair of brackets one of which is indicated at 16 are mounted adjacent the connection between the arms 22 and 24 to the cross arm 20. Each bracket 16 supports an arm rest as shown at 34 and 36. At their free ends, the arm rests are provided with adjustably positionable arms 38 and 40 which are intended to support a flexible backing strip 42 at a preselected angular position. Intermediate the upper and lower ends of each arm 22 and 24 seat brackets 14 and 15 are provided which support seat arms 30 and 32 so that the arms 30 and 32 will extend substantially perpendicular to the respective arms 22 or 24. The seat arms 30 and 32 have cross sectional dimensions such that they can be easily inserted into reinforcing tubes 46 and 48, respectively, which in turn are inserted into the loops of the flexible seat 50. To enable a non-ambulatory user to mount the chair lift 10, it is preferable that the longitudinal distance between the loops 46' and 48' be slightly larger than the perpendicular distance between the seat arms 30 and 32. In this way, when the user is seated on a cushion surface such as the mattress of a bed or a couch, sufficient play will be provided to render insertion of the arms 30 and 32 achievable without requiring any significant lifting of the body of the user.

Turning now to FIGS. 2-4, there is illustrated in detail one embodiment of a lifting mechanism useful in the present invention. The description of the lifting mechanism with respect to one of the arms 22 or 24 applies fully to the opposite arm and thus will only be described in connection with post 24. Specifically, as shown in FIG. 4, a threaded rod 70 is securely connected through an opening in the bottom wall of the cross frame arm 20 and is non-rotatably connected to or formed integrally with nut 65 which is rotatable with rod 70 relative to the frame arm 20 about the longitudinal axis of the rod 70. Interiorly of the post 24, there is provided a cross plate 76 which includes a threaded bore 77 through which the threaded rod 70 extends. At the free end of the rod 74 opposite the nut 65 there is provided a stop nut 74 which may be held in place by a key element 73. With the arrangement, upon rotation of the nut 65, in one direction relative movement between the frame 62 and telescoping post 24 will be achieved. Rollers 72 are provided to maintain the spacing between the outer wall of the frame 62 and the inner wall of the post 24. Pins 72' serve both to hold the rollers 72 in place and to allow the rollers to rotate. Since an identical mechanism is located interiorly of frame member 22 and its cooperation with post 60, only the mechanism for translating rotary motion to the associated screw threaded rods 68 and 70 as shown in FIG. 2 will now be explained. The cross frame member 20 is provided with a centrally located rotatable post 94 which may be provided externally with a manual engageble handle 95. The post 94 is provided with spaced gear teeth for engaging chain links 64 and 66 which are used, respectively, to rotate the nut 65 associated, respectively with each of the threaded rods 68 and 70. With such an arrangement, the user will be assured of uniform lifting motion relative to each of the posts 60 and 62 upon rotation of the handle 95. In use, a user will position the seat 50 under his or her body and with the back support 42 removed, the user need merely pull the chair lift 10 towards his person while making sure that the seat arms 30 and 32 penetrate into the loops 46' and 48', respectively. Alternately, the reinforcing tubes 46 and 48 may be employed and these may be inserted into their respective loops 46' and 48' prior to insertion of the seat arms 30 and 32. With the seat arms 30 and 32 fully inserted into the loops 46' and 48', the user or an attendant may then affect lifting by rotating the handle 95 of crank 44 a number of turns sufficient to allow the bottom of the seat portion 50 to clear the underlying support surface. The patient on the chair lift will then be able to be moved by a user or under his or her power clear of the support surface. An attendant can then place the back support 42 in position on the arms 38 and 40 at the desired angular position. An attendant then may proceed to move the patient or user to another location as desired.

Figure 5A:
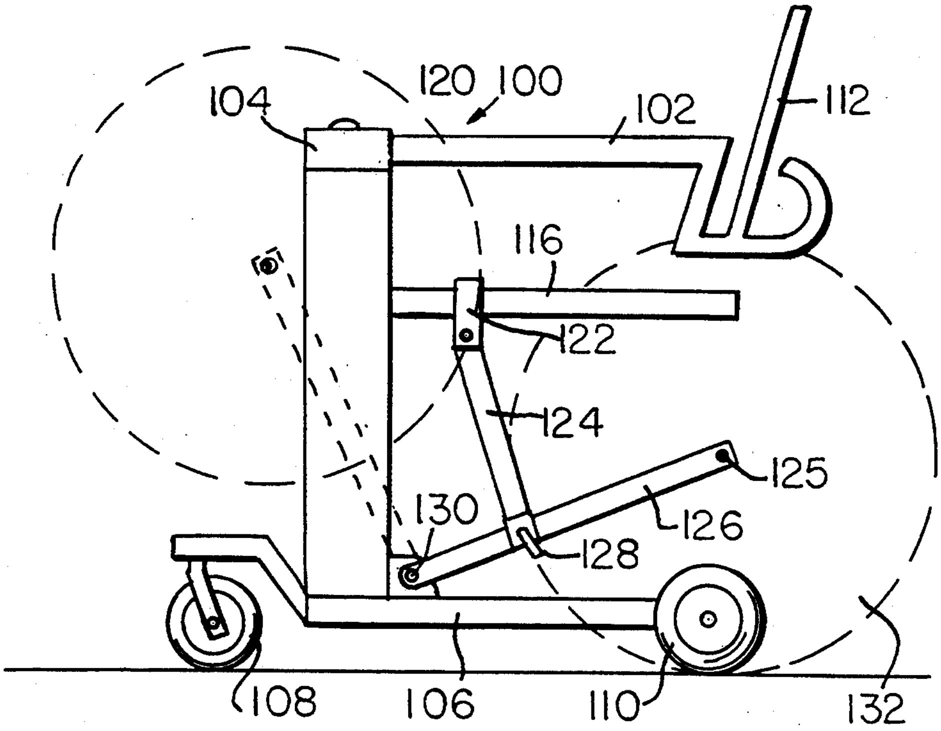
FIGS. 5A, 5B and 5C are schematic illustrations of alternate embodiments of the present invention.
Figure 5C:
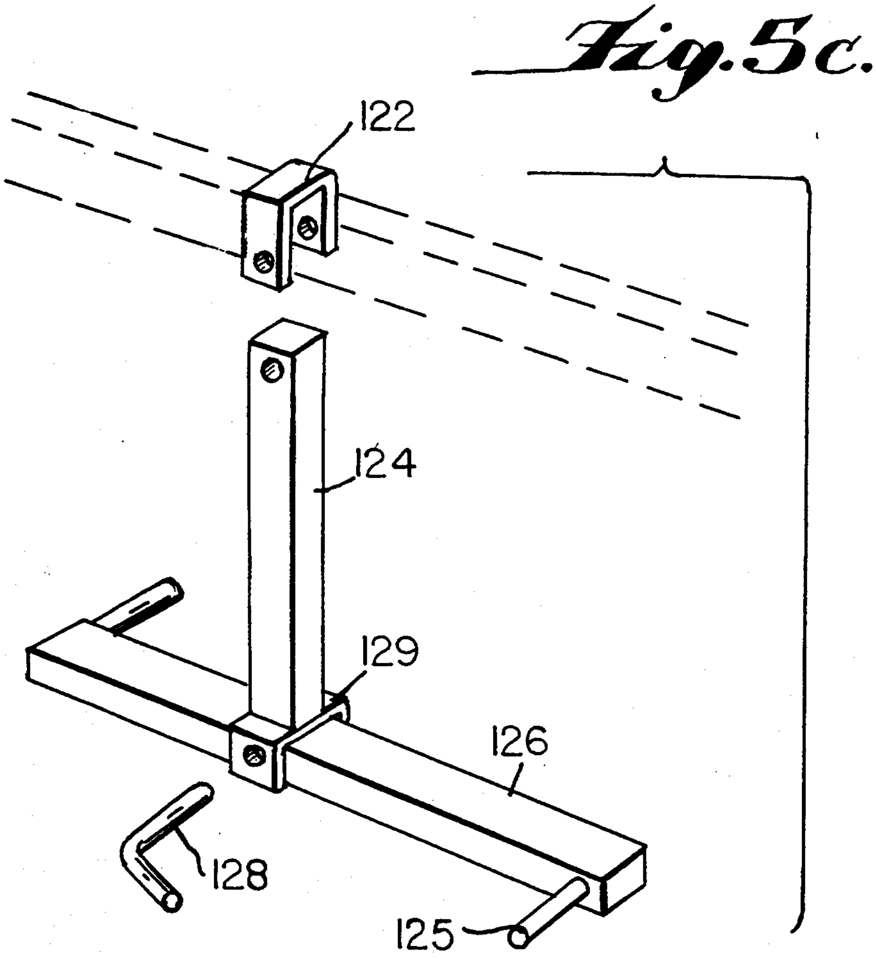
Figure 5B:
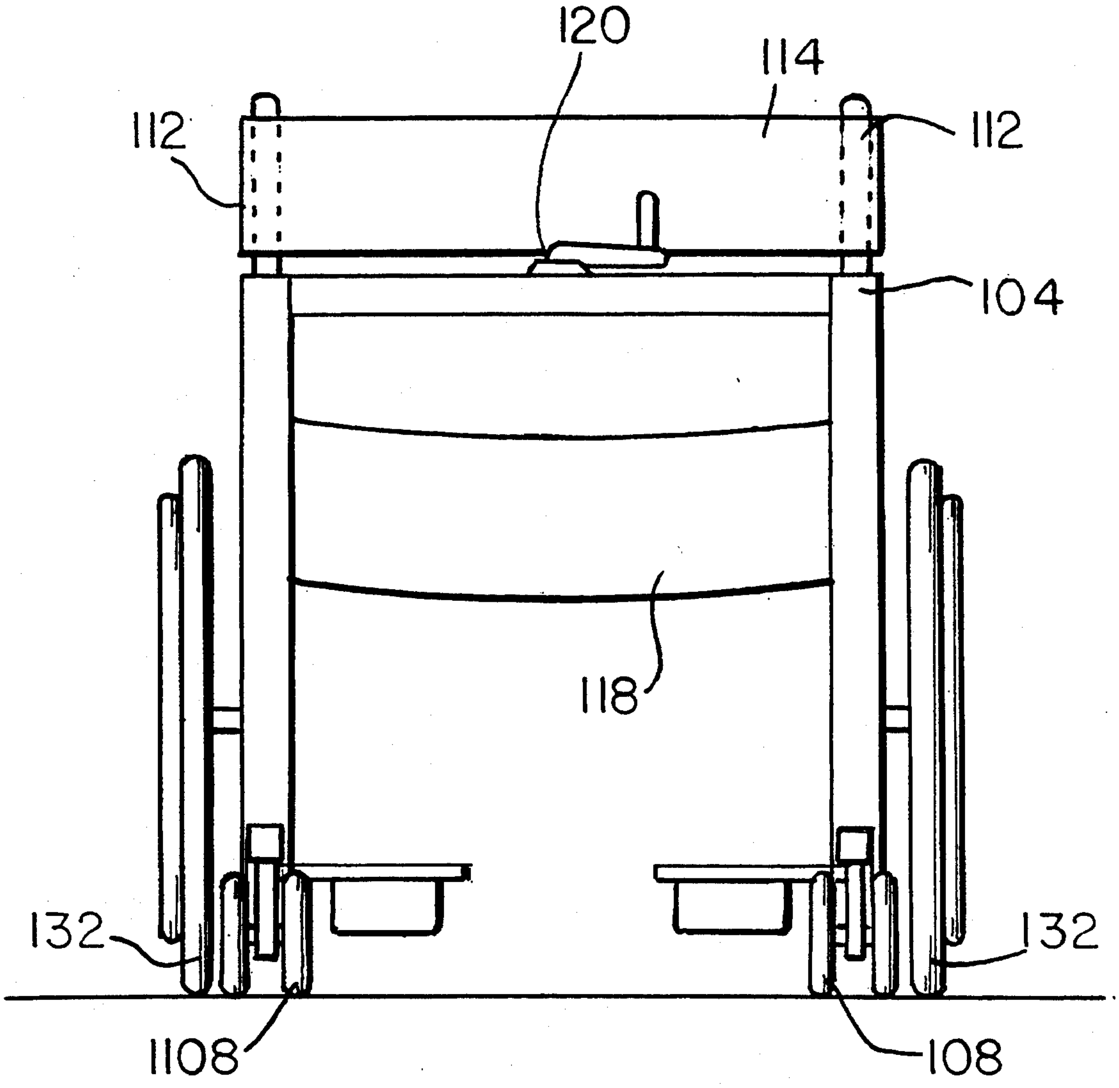

Referring now to FIGS. 5A, 5B, and 5C, the second embodiment of the present invention is shown generally at 100. Frame member 104 is movable toward and away from a frame member (not shown) disposed interiorally thereof by a mechanism similar to that shown with respect to the first embodiment. Crank 120, which is accessible to a user, controls the separation of the two frame members and is disposed on the frame member 104. The interior frame member is connected to wheeled base structure 106 having front caster wheels 108 and rear wheels 110. Frame member 104 is provided with arms 102 (only one shown) which are attached to a back supports 112. Back supports 112 hold a detachable back 114 in a position such that back 114 provides support to a user.

Also extending from frame member 104 are seat arms 116. Seat arms 116 support the seat 118. The seat 118 functions in the same manner as in the first embodiment.

The second embodiment 100 includes bracket 122, which connects seat arm 116 with the beam 124. The beam 124 is connected to the large wheel support beam 126 by pin 128 that penetrates a bracket 129 at the end of the beam 124 opposite bracket 122. Large wheel support beam 126 has a large wheel 132 mounted at the end thereof. The wheel 132 is similar to those used with wheelchairs and allows faster and easier movement of the device across a surface. When the pin 128 is removed from the bracket 129, large wheel support beam is pivotable about pivot point 130 attached to the wheeled base structure 106. This pivoting allows for the large wheel to be disengaged from the ground and makes ingress and egress from the device easier for a user.

While the present invention has been described in relation to what is presently considered to be the most practical and preferred embodiments, it is to be understood that the invention is not to be limited to the disclosed embodiments. On the contrary, various modifications and alternate arrangements are intended to be within the scope of the claims.

What is claimed is:

1. A chair for moving a user, said chair comprising a first wheeled frame and a second frame mounted on said first frame so as to be movable generally toward and away from said first frame, said frame including means releasably engaging a seat and said chair further comprising rollers disposed between an outer surface of said first frame and an inner surface of said second frame for maintaining spacing between said first and second frames.

2. A chair as claimed in claim 1, wherein said second frame is substantially U-shaped.

3. A chair as claimed in claim 1, wherein said chair is collapsible.

4. A chair as claimed in claim 1, further comprising a back mounted to supports extending from said second frame.

5. A chair as claimed in claim 4, wherein said back is adapted to detach from said supports by moving said back away from said supports.

6. A chair for moving a user, said chair comprising a first wheel frame and a U-shaped second frame mounted on said first frame so as to be movable generally toward and away from said first frame, said second frame including means engaging a seat, said means comprising elongate insertable seat support members extending from said second frame, said seat having spaced apart support receiving portions into which said seat support members are slidably insertable, said chair further comprising a large wheel, which provides for easy movement of said chair across a surface, said large wheel being supported by a pivotable support, which allows for said large wheel to be disengaged from said surface, said pivotable support being pivotably attached to said first frame.

7. A chair as claimed in claim 6, further comprising rollers disposed between an outer surface of said first frame and an inner surface of said second frame for maintaining spacing between said first and second frames.

8. A chair as claimed in claim 6, further comprising footrests attached to said first frame member for supporting the user's feet.

9. A chair as claimed in claim 6, further comprising a back mounted to supports extending from said second frame.

10. A chair as claimed in claim 9, wherein said back is adapted to detach from said supports by moving said back away from said supports.

11. A chair for moving a user, said chair comprising:

a first wheeled frame;

a second frame mounted on said first frame so as to be movable generally toward and away from said first frame, said second frame including means releasably engaging a seat;

a crank disposed on said second frame for controlling separation of said first and second frames; and belts connected to said crank that drive the separation of said first and second frames.

12. A chair for moving a user, said chair comprising:

a first wheeled frame;

a U-shaped second frame mounted on said first frame so as to be movable generally toward and away from said first frame, said second frame including means engaging a seat;

a crank disposed on said second frame for controlling separation of said first and second frames; and belts connected to said crank that drive the separation of said first and second frames.

13. A chair for moving a user, said chair comprising a first wheeled frame and a second frame mounted on said first frame so as to be movable generally toward and away from said first frame, said second frame including means releasably engaging a seat, said chair further comprising a large wheel, which provides for easy movement of said chair across a surface, said large wheel being supported by a pivotable support which allows said large wheel to be disengaged from said surface.

14. A chair for moving a user, said chair comprising a first wheeled frame and a second frame mounted on said first frame so as to be movable generally toward and away from said first frame, said second frame including means releasably engaging a seat, said means comprising elongate insertable seat support members extending from said second frame, said seat having spaced apart support receiving portions into which said seat support members are slidably insertable, said chair further comprising foot rests attached to said first frame member for supporting the user's feet.

15. The invention as claimed in claim 14 or 6 wherein said seat is constructed of flexible material and said support receiving portions of said seat are flexible, said seat includes a rigid, hollow tube inserted into each said support receiving portion of said seat.

* * * * *